United States Patent
Ramsarran et al.

(10) Patent No.: US 7,922,141 B1
(45) Date of Patent: Apr. 12, 2011

(54) MOUSE PAD APPARATUS

(76) Inventors: Vijay Ramsarran, Tamarac, FL (US);
Kamille Arman, Tamarac, FL (US)

( * ) Notice: Subject to any disclaimer, the term of this patent is extended or adjusted under 35 U.S.C. 154(b) by 92 days.

(21) Appl. No.: 12/179,334

(22) Filed: Jul. 24, 2008

(51) Int. Cl.
*A47G 29/00* (2006.01)
*B41J 11/02* (2006.01)

(52) U.S. Cl. ............ 248/346.01; 118/316.7; 118/442.2; 118/918

(58) Field of Classification Search ............ 248/346.01, 248/346.03, 118, 118.5, 916, 918, 442.2, 248/444.1, 316.7; 361/679.08, 679.6, 679.19, 361/679.4, 727
See application file for complete search history.

(56) References Cited

U.S. PATENT DOCUMENTS

| | | | |
|---|---|---|---|
| 5,490,039 A | 2/1996 | Helms | |
| 5,556,061 A | 9/1996 | Dickie | |
| 5,692,815 A * | 12/1997 | Murphy | 248/346.01 |
| 5,723,821 A * | 3/1998 | Klinger et al. | 174/135 |
| 5,732,910 A * | 3/1998 | Martin | 248/118 |
| 5,844,775 A * | 12/1998 | Lundberg | 361/679.08 |
| 5,901,934 A | 5/1999 | Wilson | |
| D423,482 S | 4/2000 | Eddins | |
| 6,175,082 B1 * | 1/2001 | Klinger et al. | 174/135 |
| 6,446,928 B1 * | 9/2002 | Oliver | 248/346.01 |
| 6,511,039 B1 | 1/2003 | Nash | |
| 6,513,775 B1 * | 2/2003 | Hostetler | 248/304 |
| 6,757,159 B2 | 6/2004 | Zarek et al. | |
| 6,947,026 B2 * | 9/2005 | Mattson | 248/346.01 |
| 6,962,311 B1 * | 11/2005 | Sykes | 248/118 |
| 2005/0206283 A1 * | 9/2005 | Stiles et al. | 312/330.1 |
| 2007/0272804 A1 * | 11/2007 | Tisdale | 248/51 |

* cited by examiner

*Primary Examiner* — Tan Le
(74) *Attorney, Agent, or Firm* — Crossley Patent Law; Mark A. Crossley

(57) ABSTRACT

The mouse pad apparatus removably attaches to a laptop computer via spaced apart flex clips affixed to one side of the platform border. The mouse pad platform is optionally transparent and textured and provides for use of a mouse with a laptop computer. The flex clips provide a positive, cushioned, frictional engagement of the apparatus with the edge of the computer. The slot within the platform provides for the pull out tray which can retain a writing surface, photo, or other material, visible through the transparent platform surface.

5 Claims, 3 Drawing Sheets

MOUSE PAD APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

The portability of laptop computers has seen such in greater acceptance daily. Laptop computers, though, do not typically include a mouse pad, but instead usually have a touch pad. Not all users prefer a touch pad, even if their preference either by need or desire is a laptop computer. Previously, some have proposed a pull out mouse pad built into a laptop. This does not, though, provide the best solution, as total redesign of a laptop is required, and such does not provide for retrofit to existing laptops. What has been needed is a mouse pad apparatus that universally and removably fits virtually all laptop computers. The present mouse pad apparatus provides such, along with other desirable useful features.

FIELD OF THE INVENTION

The mouse pad apparatus relates to laptop computer accessories and more especially to a detachable mouse pad with transparent platform and pull out tray.

SUMMARY OF THE INVENTION

The general purpose of the mouse pad apparatus, described subsequently in greater detail, is to provide a mouse pad apparatus which has many novel features that result in an improved mouse pad apparatus which is not anticipated, rendered obvious, suggested, or even implied by prior art, either alone or in combination thereof.

To attain this, the mouse pad apparatus provides for removable fit to the edge of virtually any laptop computer. The flexible semicircular clips provide removable fit that does not interfere with the laptop's keyboard. The friction pads of the clips' legs provide positive engagement with the computer edge. The apparatus thereby provides for a mouse pad surface if a user does not wish to use a touch pad or other such pointer or device, but instead prefers a mouse. A border is elevated above and surrounds the optionally transparent textured mouse pad platform surface. The light texture of the platform surface provides for best mouse function. The platform surface is held parallel to the keyboard surface of the laptop computer. The pull out tray slot is disposed between the platform surface and platform bottom. The slot within platform is illustrated as open to the fourth platform side; however, the slot may also be open to the second side and the third side, optionally. The pull out tray provides a surface upon which an additional material may be placed. The added material may be a grease pencil surface, writing paper, a sketch, a picture, or other like item, which is viewable through the transparent platform surface.

Thus has been broadly outlined the more important features of the improved mouse pad apparatus so that the detailed description thereof that follows may be better understood and in order that the present contribution to the art may be better appreciated.

An object of the mouse pad apparatus is to provide a mouse pad for a laptop computer.

Another object of the mouse pad apparatus is to removably and snugly fit virtually any laptop computer edge.

A further object of the mouse pad apparatus is to negate interference with a laptop computer's keyboard.

An added object of the mouse pad apparatus is to provide a pull out tray inclusive with the mouse platform.

And, an object of the mouse pad apparatus is to provide a transparent textured platform surface.

These together with additional objects, features and advantages of the improved mouse pad apparatus will be readily apparent to those of ordinary skill in the art upon reading the following detailed description of presently preferred, but nonetheless illustrative, embodiments of the improved mouse pad apparatus when taken in conjunction with the accompanying drawings.

In this respect, before explaining the current embodiments of the improved mouse pad apparatus in detail, it is to be understood that the mouse pad apparatus is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved mouse pad apparatus. It is therefore important that the claims be regarded as including such equivalent constructions insofar as they do not depart from the spirit and scope of the mouse pad apparatus. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the mouse pad apparatus generally designated by the reference number 10 will be described.

Figure 1:
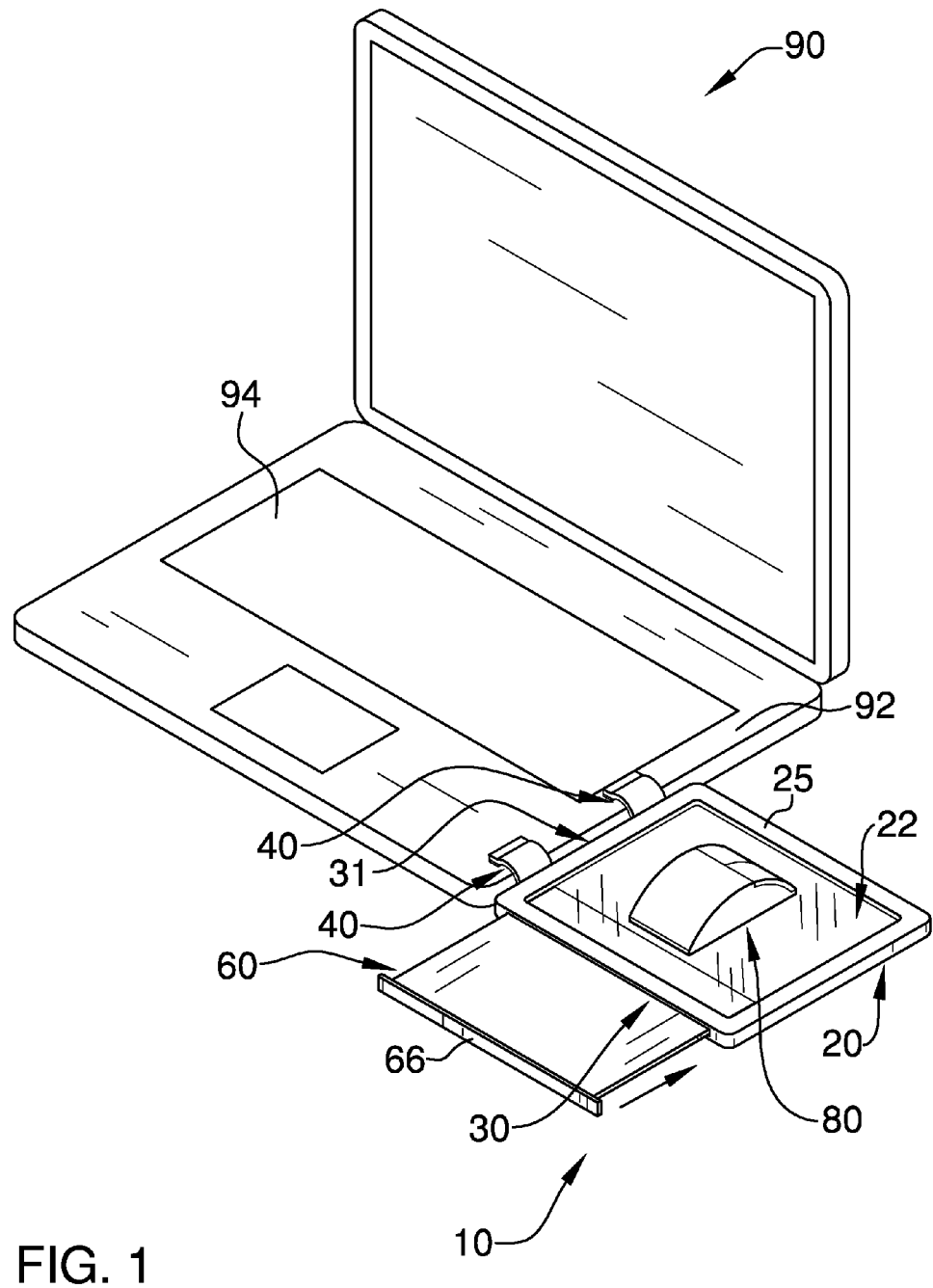
FIG. 1 is a perspective view of the apparatus attached to an existing laptop computer.

Referring to FIG. 1, the mouse pad apparatus 10 removably attaches to the edge 92 of an existing laptop computer 90. The apparatus 10 attaches to the computer 90 via the spaced apart flex clips 40 affixed to the first side 31 of the platform 20. The apparatus 10 platform surface 22 provides an operational surface 22 for an existing mouse 80. The border 25 of the platform 20 provides a boundary elevated above the surface 22 so that the mouse 80 is slideably captured. The pull out tray 60 with grip tab 66 provides for additional needs such as an added work surface, for example.

Figure 2:
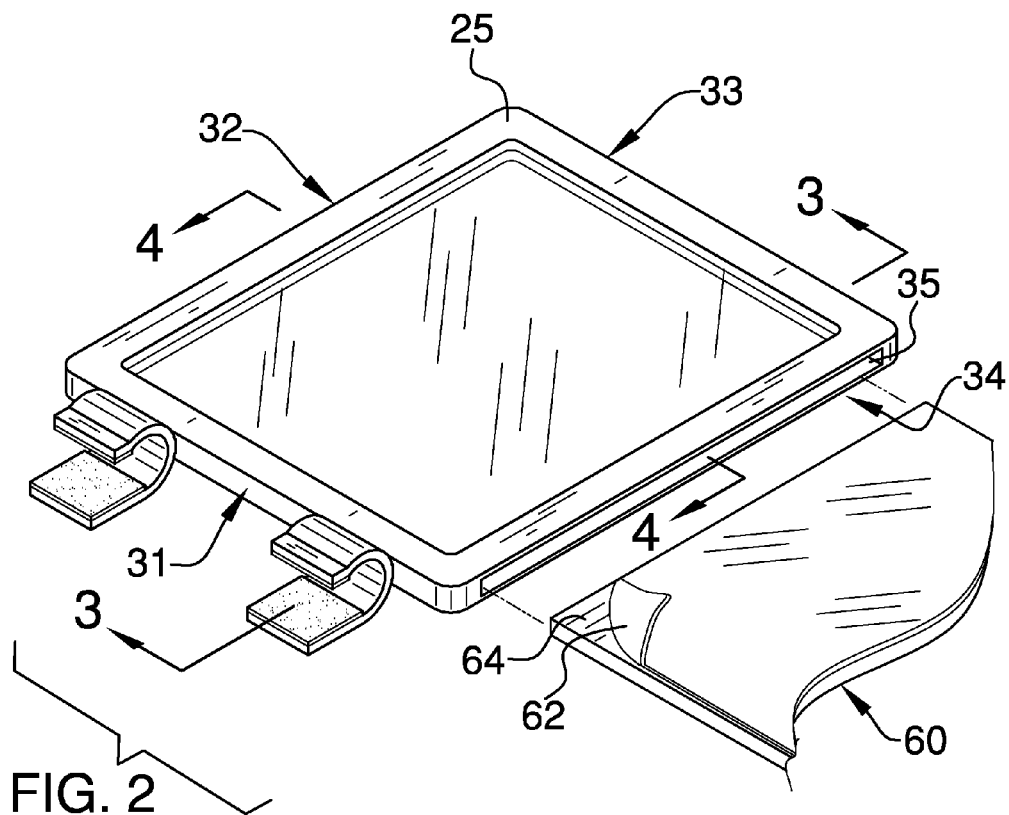
FIG. 2 is a perspective view with pull out tray fully removed.
Figure 3:
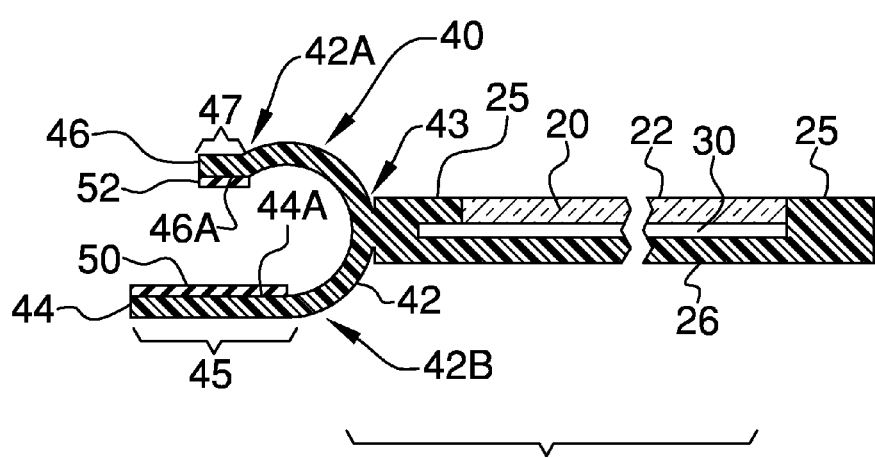
FIG. 3 is a lateral cross sectional view of FIG. 2.
Figure 4:
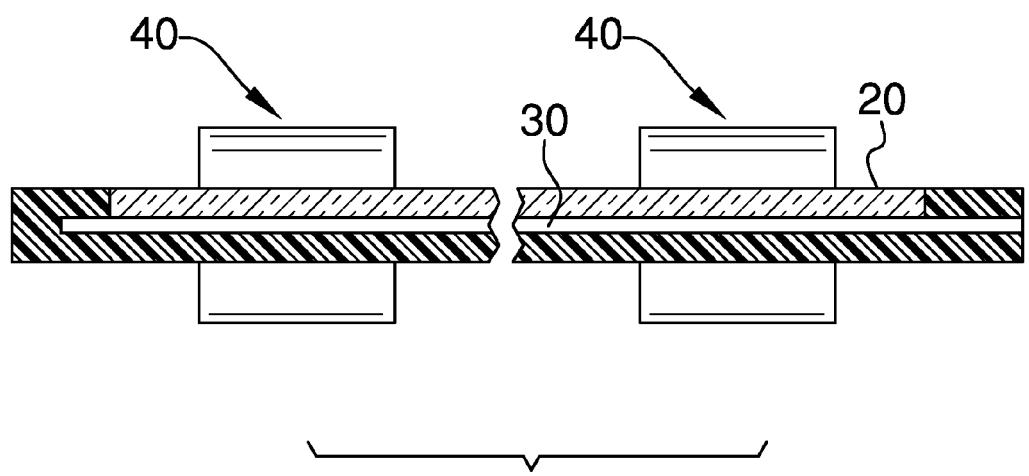
FIG. 4 is a lateral third side cross sectional view of FIG. 2.

Referring to FIGS. 2-4, the apparatus 10 further comprises the rectangular platform 20 with border 25 having a first side 31 spaced apart from a third side 33, and a second side 32 spaced apart from a fourth side 34. The platform surface 22 is optionally available in a transparent textured surface 22 atop the platform 20. The platform bottom 26 connects the platform 20 first side 31, second side 32, third side 33, and fourth side 34. The pair of flex clips 40 is affixed to the first side 31 border 25. The flex clips 40 further comprise a flexible semicircular curl 42. The platform 20 first side 31 is attached to the curl outside 43. The first leg 44 is affixed to the bottom 42b of the semicircular curl 42. The first leg 44 has a first leg length 45. The first leg 44 is parallel to the platform 20. The first friction pad 50 is affixed to the first leg inner surface 44a. The second leg 46 is affixed to the top 42a of the semicircular curl 42. The second leg 46 has a second leg length 47 shorter than the first leg length 45. The second leg 46 is parallel to the platform 20. The second friction pad 52 is affixed to the second leg inner surface 46a. The first leg length 45 and first friction pad 50 provide a lengthy contact for a bottom of the edge 92 of the laptop computer 90. The second leg length 47 ensures that the second leg 46 and second friction pad 52 do not interfere with the laptop computer 90 keyboard 94. The slot 30 is disposed between the platform surface 22 and the platform bottom 26. The slot 30 is open to the fourth side 34 of the platform 20. The pull out tray 60 is slideably disposed within the slot 30. The pull out tray 60 further comprises the tacky upper surface 64 which is in receipt of a removable writing surface 62. The removable surface 62 may also be paper, other material such as a sketch, a photograph, or other like item which is visible through the transparent platform surface 22.

With respect to the above description then, it is to be realized that the optimum dimensional relationships for the parts of the mouse pad apparatus, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the mouse pad apparatus.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the mouse pad apparatus may be used.

Therefore, the foregoing is considered as illustrative only of the principles of the mouse pad apparatus. Further, since numerous modifications and changes will readily occur to those skilled in the art, it is not desired to limit the mouse pad apparatus to the exact construction and operation shown and described, and accordingly, all suitable modifications and equivalents may be resorted to, falling within the scope of the mouse pad apparatus.

What is claimed is:

1. A mouse pad apparatus, comprising:
    a rectangular platform with border, the platform having a first side spaced apart from a third side, and a second side spaced apart from a fourth side;
    a surface atop the platform, the surface in slideable movable receipt of an existing computer mouse;
    a border disposed continuously around the sides of the platform;
    a platform bottom connecting the platform sides;
    a pair of spaced apart flex clips affixed to the first side border, the flex clips detachably connecting the platform to an existing laptop computer edge, the flex clips comprising:
        a flexible semicircular curl, the platform border first side attached to a curl outside;
        a first leg affixed to a bottom of the semicircular curl, the first leg having a first leg length, the first leg parallel to the platform;
        a first friction pad affixed to a first leg inner surface;
        a second leg affixed to a top of the semicircular curl, the second leg having a second leg length shorter than the first leg length, the second leg parallel to the platform;
        a second friction pad affixed to a second leg inner surface;
    a slot disposed between the platform surface and the platform bottom;
    a pull out tray slideably disposed within the slot.

2. The apparatus according to claim 1 wherein the platform surface further comprises a transparent surface.

3. The apparatus according to claim 1 wherein the platform surface further comprises a textured surface.

4. The apparatus according to claim 2 wherein the platform surface further comprises a textured surface.

5. A mouse pad apparatus, comprising:
    a rectangular platform with border, the platform having a first side spaced apart from a third side, and a second side spaced apart from a fourth side;
    a transparent textured surface atop the platform, the surface in slideable movable receipt of an existing computer mouse;
    a border disposed continuously around the sides of the platform, the border slightly higher than the platform surface;
    a platform bottom connecting the platform sides;
    a pair of spaced apart flex clips affixed to the first side border, the flex clips detachably connecting the platform to an existing laptop computer edge, the flex clips comprising:
        a flexible semicircular curl, the platform first side border attached to a curl outside;
        a first leg affixed to a bottom of the semicircular curl, the first leg having a first leg length, the first leg parallel to the platform;
        a first friction pad affixed to a first leg inner surface;
        a second leg affixed to a top of the semicircular curl, the second leg having a second leg length shorter than the first leg length, the second leg parallel to the platform;
        a second friction pad affixed to a second leg inner surface;
    a slot disposed between the platform surface and the platform bottom, the slot open to the fourth side of the platform;
    a pull out tray slideably disposed within the slot, the pull out tray further comprising:
        a tacky upper surface in removable receipt of a writing surface.

* * * * *